US010956881B2

(12) United States Patent
Moskowitz et al.

(10) Patent No.: US 10,956,881 B2
(45) Date of Patent: Mar. 23, 2021

(54) METHODS AND SYSTEMS FOR BIOMETRIC CARD ENROLLMENT (71) Applicant: Mastercard International Incorporated, Purchase, NY (US)

(72) Inventors: Ellen Moskowitz, New Rochelle, NY (US); Ashfaq Kamal, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 340 days.

(21) Appl. No.: 16/030,315

(22) Filed: Jul. 9, 2018

(65) Prior Publication Data
US 2020/0013032 A1 Jan. 9, 2020

(51) Int. Cl.
*G06Q 20/10* (2012.01)
*G06Q 20/34* (2012.01)
*G06K 19/07* (2006.01)

(52) U.S. Cl.
CPC ....... *G06Q 20/105* (2013.01); *G06K 19/0728* (2013.01); *G06Q 20/341* (2013.01); *G06Q 20/352* (2013.01); *G06Q 20/3563* (2013.01)

(58) Field of Classification Search
CPC .... G06Q 20/105; G07F 7/1033; H04L 9/0838
USPC .................... 235/375, 492; 705/72
See application file for complete search history.

(56) References Cited

U.S. PATENT DOCUMENTS 9,519,901 B1  12/2016  Dorogusker
10,601,232 B1 * 3/2020 Wurmfeld ............... H02J 50/12
2005/0263596 A1  12/2005  Nelson et al.
2007/0073619 A1  3/2007  Smith
2013/0311372 A1  11/2013  Ramaci
2014/0372320 A1 * 12/2014 Goldfarb ............... G07F 7/1033
  705/72
2015/0280488 A1 * 10/2015 Wyrwas ................. H02J 50/30
  320/101
2015/0312655 A1 * 10/2015 Balakrishnan .......... H04Q 9/00
  340/870.07
2015/0317529 A1 * 11/2015 Zhou ....................... G06K 9/18
  382/190

(Continued)

OTHER PUBLICATIONS

PCT International Search Report for Application No. PCT/US2019/035930 dated Sep. 26, 2019, 7 pp.

*Primary Examiner* — Allyson N Trail
(74) *Attorney, Agent, or Firm* — Buckley, Maschoff & Talwalkar LLC (57) ABSTRACT Methods, apparatus and systems for allowing users to easily and securely enroll directly into a newly issued biometric payment card. In an embodiment, a user is provided with a biometric payment card enrollment package that includes a biometric payment card, an energy sleeve having a power source and at least a front wall and a rear wall defining an opening for accepting the biometric payment card therein, and at least one light-emitting diode (LED). The power source includes circuitry to provide power to an EMV chip of the biometric payment card when the biometric payment card is seated therein, and to provide power to the LED during a biometric enrollment process. In some embodiments, a software development kit (SDK) provided by the issuer of the biometric payment card provides support and guidance which enables the user to enroll directly into the biometric payment card.

23 Claims, 4 Drawing Sheets (56) References Cited

U.S. PATENT DOCUMENTS

| | | | |
|---|---|---|---|
| 2015/0333910 A1* | 11/2015 | Kirdahy | H04L 9/3234 |
| | | | 713/186 |
| 2016/0104151 A1 | 4/2016 | Tunnell et al. | |
| 2016/0267486 A1* | 9/2016 | Mitra | H04L 9/0838 |
| 2017/0091493 A1* | 3/2017 | Steil | G06K 7/087 |
| 2017/0262664 A1* | 9/2017 | Leiponis | G06K 7/10316 |
| 2019/0019195 A1* | 1/2019 | Dunjic | G06Q 20/4016 |
| 2019/0287108 A1* | 9/2019 | White | G06Q 20/341 |

* cited by examiner

METHODS AND SYSTEMS FOR BIOMETRIC CARD ENROLLMENT

FIELD OF THE INVENTION

Embodiments described herein generally relate to methods, apparatus and systems that allow a user to easily and securely enroll directly into his or her newly issued biometric payment card. More specifically, in some embodiments users are provided with a biometric payment card, a disposable energy sleeve, and a software development kit (SDK) provided by the issuer financial institution that issued the biometric payment card. When initiated on the use's mobile device, the issuer SDK (as included in the issuer mobile application) provides support and guidance concerning how to utilize the disposable energy sleeve with the biometric payment card in a manner which enables the user to enroll directly into the biometric payment card.

BACKGROUND

Millions of consumer transactions occur daily using payment cards, such as credit cards, debit cards, prepaid cards, and the like financial products. Payment card transactions can occur in a variety of environments, such as in a retail store, over the Internet (or online), at automatic-teller machines (ATMs), and/or via a telephone call to order merchandise via an interaction between the cardholder and a customer service representative. Fraudulent or illegal transactions can occur in each of these cases.

A typical retail store purchase transaction involves a customer bringing one or more items to a checkout counter or cash register station, where a cashier or clerk scans the items and a purchase amount is tabulated. After all of the merchandise or items are scanned, the customer pulls out his or her plastic payment card and then either swipes the payment card through a card reader (if it is a magnetic stripe card) or inserts it into, or taps it on, a chip card reader (if it is a smart payment card or a chip card). The card reader reads cardholder credential data from the payment card and then transmits that data to the cash register, which then forwards the cardholder credential data along with purchase transaction data to an acquirer financial institution (FI), which then transmits it to a payment network. Next, the payment network identifies the issuer FI which issued the customer's payment card account, and then transmits the cardholder credential data and the purchase transaction data to that issuer FI for authorization processing. If all is in order (i.e., the issuer FI verifies the cardholder credential data and confirms that the payment card account has an adequate credit line available, or in the case of a debit or prepaid card has adequate funds deposited, to cover the cost of the purchase), then the issuer FI authorizes the purchase transaction and transmits an authorization response to the payment network. The payment network forwards the authorization response to the acquirer FI, which then transmits an authorization message to the merchant's cash register and/or card reader for display to the cashier and the cardholder. In some cases, the customer is then prompted to utilize a special stylus or pen to sign an electronic signature pad associated with the card reader, but in other cases (for example, when the purchase transaction amount is below a predetermined threshold amount) the customer is not required to provide his or her signature. The customer is then typically provided with a paper receipt for the purchase transaction (which may include the merchant store name, a list of the items purchased and their cost, the total purchase amount, and an indication identifying the type of payment card account used by the customer) and then leaves the retail store.

In-store payment card purchase transaction processes may vary slightly from the above example, and may vary depending on the equipment being used by a particular merchant and/or retail store (for example, some card readers may be configured for the consumer to tap his or her near-field communication (NFC) payment card on a designated area instead of inserting or swiping the payment card through the card reader). Regardless of how cardholder data is obtained, most cashier's and/or store clerks do not bother to verify or check the cardholder's signature. Thus, a thief may be able to use a stolen payment card to make fraudulent purchases until the actual cardholder realizes that his or her payment card has been lost or stolen, and then contacts the issuer FI to cancel or suspend that payment card account.

The risk of fraudulent activity (and loss of money) has increased with the increased use of payment card accounts, and thus major payment card transaction processing companies such as Mastercard International Incorporated, Visa Inc., and the American Express Company have designed and implemented various types of anti-fraud mechanisms and/or features. For example, many payment cards have been issued that include security features such as holograms, a photograph of the cardholder appearing on the rear side of the payment card, and/or a card verification code (CVC). In addition, payment card credential data processing features have been implemented that require the cardholder to use passwords and/or personal identification numbers (PINs). The payment card transaction processing companies have also implemented various types of payment card account fraud monitoring and notification processes in order to prevent and/or curtail fraudulent activities.

In order to further reduce the risk of fraud in card-present transactions, Mastercard International Incorporated introduced the Mastercard Biometric Card, which provides a simple and secure way for cardholders to authenticate their identity for in-store purchases with a fingerprint, as an alternative to utilizing a PIN or a signature. Since biometric characteristics are difficult to duplicate, they are ideal for use to protect against fraudulent activities. The Mastercard Biometric Card includes fingerprint data that is stored on the biometric payment card itself, and during purchase transaction processing the fingerprint data never leaves the biometric payment card. Thus, the biometric payment card data is not shared with the merchant, and therefore is not transmitted to a remote server for authentication purposes.

In some purchase transaction implementations, the biometric authentication process entails a cardholder dipping or tapping his or her payment card at a chip-enabled terminal while at the same time holding his or her thumb onto a built-in fingerprint sensor on the face of the biometric payment card. The cardholder's fingerprint image is then compared against one or more biometric images of the cardholder's fingerprint stored within the card. The terminal receives data in the authorization message indicating whether the biometric authentication was successful or failed, which is forwarded to the payment card issuer. If the biometric authentication failed, then the cardholder will be asked to enter an alternate cardholder verification method (CVM) such as a PIN or a signature, which the merchant then handles in accordance with the merchant's purchase transaction risk procedures.

Advantageously, the use of the Mastercard Biometric Card requires no changes for acquirers or for merchants, because the biometric authentication procedures and/or processes are compatible with the merchant's current hardware and/or software, as the biometric authentication procedures are compatible with the EMV standard. The EMV standard (which stands for "Europay, Mastercard and Visa" standard) is a global standard for cards equipped with computer chips and the technology used to authenticate chip-card transactions. Thus, the Mastercard Biometric Card, which includes an EMV chip (a microprocessor), is compatible with any EMV-enabled terminal (globally) that has satisfactorily completed the Mastercard Terminal Integration Process (TIP). For an optimal cardholder experience using the biometric payment card, merchant terminals should be EMV-enabled, customer-facing, accessible to the cardholders, and designed so that the biometric sensor on the front of the biometric payment card is not blocked from use by the cardholder.

Test market results demonstrated that biometric card transactions using the Mastercard Biometric Card are fast because cardholders do not need to remember and enter a PIN during the checkout process. As mentioned above, biometric card transactions also do not require any changes to current EMV-enabled payment terminals, and thus there is no need for the merchant to make any hardware or software updates. Thus, cardholders enjoy an easy and secure checkout experience, while merchants can have enhanced certainty of genuine cardholder identity, which may result in an increase in revenue (from a reduction in false declines and/or a reduction in forgotten PIN transactions).

Accordingly, it would be beneficial for merchants and issuers if cardholders replaced their current chip cards and/or magnetic stripe payment cards with biometric payment cards. In order to facilitate biometric payment card usage, it would be desirable to provide a consumer with a biometric card enrollment process that allows the consumer to easily and securely enroll with his or her biometric data onto the card while at home instead of queuing at a local issuer bank branch. Such a process would require the consumer to directly enter biometric data into a newly issued biometric payment card in conjunction with the issuer's card activation process, and—when successful—would save the consumer from having to take a trip to the issuer FI (such as a bank) or to another supervised location in order to enroll.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "consumer" may be used interchangeably with the term "cardholder" or "user" and such terms are used herein to refer to a consumer, person, individual, business or other entity that owns (or is authorized to use) a financial account such as a payment card account (for example, a credit card). In addition, the term "payment card account" may include a credit card account, a debit card account, or other type of plastic payment card that an account holder may access. The term "payment card account number" includes a number that identifies a payment card system account or a number carried by a payment card, and/or a number that is used to route a transaction in a payment network that handles debit card and/or credit card transactions and the like. Moreover, as used herein the terms "payment network," "payment card system" and/or "payment system" refer to a system and/or network for processing and/or handling purchase transactions and related financial transactions, which may be operated by a payment card system operator such as Mastercard International Incorporated (the assignee of the present application), or a similar system. In some embodiments, the term "payment card system" may be limited to systems in which member financial institutions (such as banks) issue payment card accounts to individuals, businesses and/or other entities or organizations.

As used herein, the term "issuer" and/or "issuer FI" is used to refer to the financial institution or entity that issues a payment account (such as a credit card or debit card account) to a consumer or cardholder. The issuer of a payment card maintains the payment card accounts of its cardholders.

In general, and for the purpose of introducing concepts of novel embodiments described herein, disclosed are methods, apparatus and systems that allow a consumer or user to easily and securely enroll his or her biometric data directly into a newly issued biometric payment card. It has been recognized that capturing and loading biometric data onto a biometric payment card is not as straight forward as loading biometric data onto a mobile device (such as a smartphone). For example, saving biometric data such as fingerprint data onto the mobile device can be relatively straight forward, by following directions and/or imagery and/or feedback which can be presented on a display screen of the mobile device as enrollment progresses, while utilizing an integrated fingerprint sensor of the mobile device. Consumers, however, want the convenience to enroll "at-home" when receiving a newly issued biometric payment card, but the process can be more involved and/or not as intuitive or as familiar as enrolling with a mobile device. Accordingly, novel embodiments disclosed herein provide an enrollment package to the consumer that includes a newly-issued biometric payment card and a disposable energy sleeve. In addition, the issuer FI provides instructions for how to obtain biometric enrollment software development kit (SDK) support (which can easily be embedded in the issuer's mobile banking or financial services app) for the consumer's mobile device, which can then be used to guide the consumer through the enrollment process.

Accordingly, in embodiments disclosed herein, an issuer financial institution (FI) sends an enrollment package to the consumer who applied for (and qualified for) obtaining a biometric payment card account. The enrollment package contains a biometric payment card along with a disposable energy sleeve, and may also include written instructions directing the consumer to first activate basic payment card functions (outside the biometric features). The basic payment card functions may be activated in a number of ways, for example, by calling a voice recognition unit (VRU) from a home telephone number (which the issuer FI has on file), or by calling a customer service representative, or by logging into the issuer's web site or application to confirm receipt of the enrollment package containing the biometric payment card. In order to activate the biometric technology features of the biometric payment card, the consumer must have access to the issuer's mobile app which contains the biometric enrollment software development kit (SDK) or must download the biometric enrollment SDK from the issuer's website (or other online location) to the consumer's mobile device (such as a smartphone). The biometric enrollment SDK permits a near-field communication (NFC) connection or a Bluetooth connection to occur between the consumer's mobile device and the disposable energy sleeve that signals the enrollment stages to the consumer, and also allows clear communications to occur concerning how the biometric payment card enrollment process is progressing and what constitutes success. Thus, the biometric enrollment SDK provides real-time instructions, guidance and/or support concerning how to utilize the disposable energy sleeve in conjunction with the biometric payment card in a manner that enables the consumer to enroll his or her fingerprints directly into the biometric payment card at home, without having to travel to, for example, an issuer FI location such as a bank.

For ease of understanding, the example embodiments described herein include a biometric payment card having a fingerprint sensor, and thus the described processes involve obtaining fingerprint data from the customer or cardholder during the biometric enrollment process. However, other types of biometric sensors could be integrated onto a biometric payment card instead of, or in addition to, a fingerprint sensor, such as a pulse, vein or heartbeat scanner, and then obtaining the requisite data from the consumer. Thus, embodiments described herein also contemplate providing a biometric enrollment package (and a biometric enrollment SDK) for use by the consumer to obtain other types of required biometric data so that the consumer can enroll his or her biometric payment card while at home.

After enrollment, the biometric payment card can be used to perform purchase transactions by, for example, having the cardholder dip or tap the biometric payment card at a merchant's chip-enabled terminal while at the same time holding his or finger (such as her thumb) onto a built-in or integrated fingerprint sensor located on the face of the biometric payment card. A processor embedded in the chip of the biometric payment card then compares the user's fingerprint image (picked up by the fingerprint sensor) to at least one biometric image stored on the card (in some embodiments, the biometric payment card stores two or more images and during operation the biometric payment card processor compares the user's fingerprint image to at least two biometric images stored on the card). When a match occurs, the biometric payment card transmits an indication of successful cardholder authentication along with payment card account credentials to the merchant's chip reader, which forwards the information to an acquirer FI for further processing (which typically involves a payment card network and the issuer FI that issued the biometric payment card). In some implementations, if the biometric authentication failed (there was no match), then the cardholder will be asked to enter an alternate cardholder verification method (such as a PIN), which the merchant then handles in a manner according to that merchant's purchase transaction risk procedures.

Figure 1A:
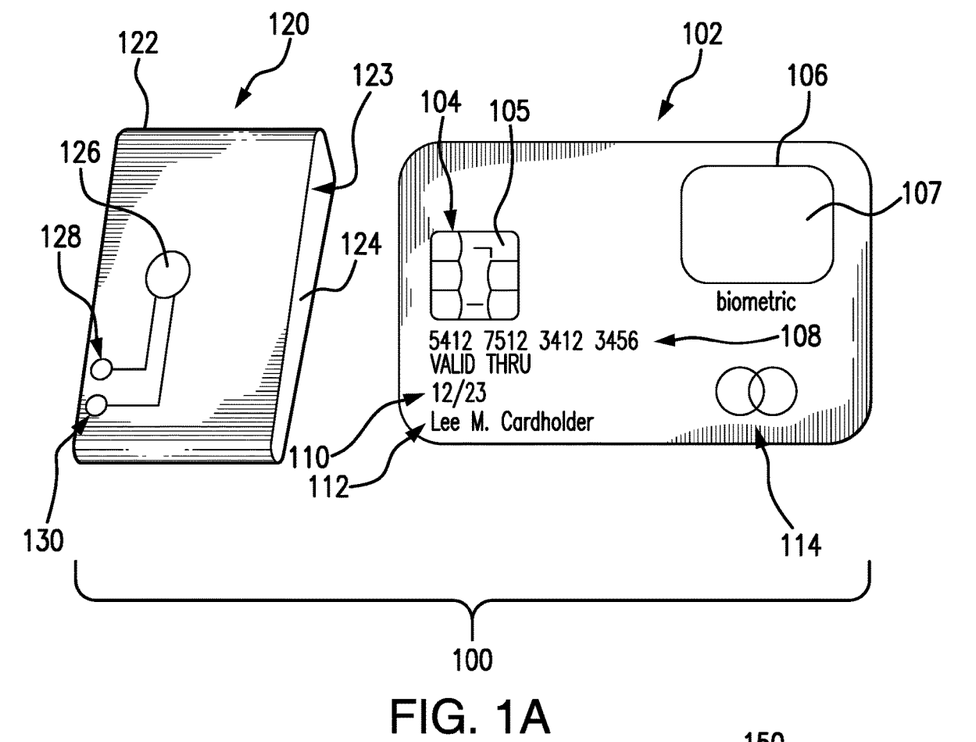
FIG. 1A is a diagram illustrating the components of a biometric payment card enrollment package according to some embodiments of the disclosure.

FIG. 1A is a diagram illustrating the components of a biometric payment card enrollment package 100 in accordance with some embodiments. The enrollment package 100 includes a biometric payment card 102 and an energy sleeve 120 (that may be disposable), which the consumer or user receives from his or her issuer FI, for example, via the U.S. mail or via courier at the consumer's home or residence. The energy sleeve 120 enables the consumer to enroll his or her biometric data (which may be two or more biometric data sets) directly into a storage area (not shown) within the biometric payment card 102.

The biometric payment card 102 may be a smart card or chip card that includes an EMV chip 104 having a contact faceplate 105 on the front side of the card. It should be understood that the EMV chip 104 is a computer chip with an operating system, application(s), and a data storage component or element. The EMV chip 104 permits the biometric payment card 102 to interact with a merchant card reader (not shown) in accordance with EMV specifications in order to conduct purchase transactions. In this embodiment, the EMV chip 104 is operably connected to a biometric sensor, which in this example is an integrated or embedded fingerprint sensor 106 having a finger sensor pad 107 on the front side of the biometric payment card 102. In some embodiments, the biometric payment card 102 is made of a plastic material, and has dimensions conforming to the known ID-1 format, which is commonly used for credit cards, debit cards, ATM cards and the like. (The ID-1 format specifies a card size of 85.60×53.98 mm (3⅜ inches by 2⅛ inches), and includes rounded corners having a radius of between 2.88 millimeters (mm) to 3.48 mm). The biometric payment card 102 may also include a primary account number (PAN) 108, an expiration date 110, the cardholder's name 112, and a payment card logo 114 printed or embossed on the front side or face of the payment card. It should be understood that the biometric payment card 102 may be made of other types of materials (i.e., a composite material), and may include other features and/or components.

Referring again to FIG. 1A, the energy sleeve 120 may be made of a transparent or opaque material, having a front wall 122 and a rear wall 124 that define an opening 123 therebetween. The opening 123 has dimensions for accepting the biometric payment card 102 therein, such that at least a portion of the biometric payment card can be housed therein. In some embodiments, the energy sleeve includes a power source 126 such as a battery (which may be, for example, a lithium battery or other electronic power cell) that is positioned in a central location of the sleeve 120. However, other implementations are contemplated wherein the power source 126 may be positioned in another location of the sleeve. The battery 126 includes wires which, when the biometric payment card 102 is positioned within the energy sleeve, align with the contact faceplate 105 of the EMV chip 104, such that power can be provided to the EMV chip 104 to power up the biometric payment card 102. The energy sleeve 120 also includes a red light-emitting diode (LED) 128 and a green LED 130 that are operably connected to the battery 126. In some embodiments, during the enrollment process, the red LED 128 and the green LED 130 operate to provide visual indications to the customer concerning the status of the enrollment process, and function to transmit status of the enrollment process to the customer's mobile device (as described herein).

Thus, in some embodiments the energy sleeve 120 is configured to envelope or surround a portion of the biometric payment card 102 inserted therein, and operates to aid in the enrollment process. Accordingly, in some implementations, the energy sleeve 120 may include introductory instructions (not shown) printed thereon to help the consumer understand the initial step(s) of the biometric card enrollment process. For example, the initial instructions may include a directive to first open or run an issuer's mobile payment application on the customer's mobile device, then to insert the biometric payment card 102 through the opening 123 of the energy sleeve 120 such that the faceplate 105 of the EMV chip 104 is seated inside, and next wait to see if the green LED 128 illuminates. Further instructions may then be provided on a display screen (not shown) of the customer's mobile device.

It should also be understood that, in some implementations the energy sleeve 102 may have a different shape and/or may be made of different materials, and may include only one LED, or several LEDs. In addition, in some embodiments the LEDs may instead be on the biometric payment card 102 (not shown) instead of on the energy sleeve 120. In addition, other types of LEDs (such as infra-red LEDs) could be utilized. It should be understood that, with regard to the components of the enrollment package 100, the only requirements are that the energy sleeve 120 be configured to provide power to and communicate with the biometric payment card 102, and that the energy sleeve includes components and/or features allowing communication with a mobile device of the consumer, so that the consumer can be guided through the enrollment process (which is explained below).

In some implementations, the energy sleeve 120 is inexpensive to manufacture, and therefore may be disposable after use. Thus, after the enrollment process is completed, the consumer may be instructed to dispose of the energy sleeve by discarding it in the trash. However, in some other embodiments, the energy sleeve 120 may be recyclable. In this case, the customer may be provided with instructions for recycling the battery 124. In some implementations, the issuer may provide the consumer with a prepaid mailer so that the energy sleeve 120 can be sent to a recycling center.

Figure 1B:
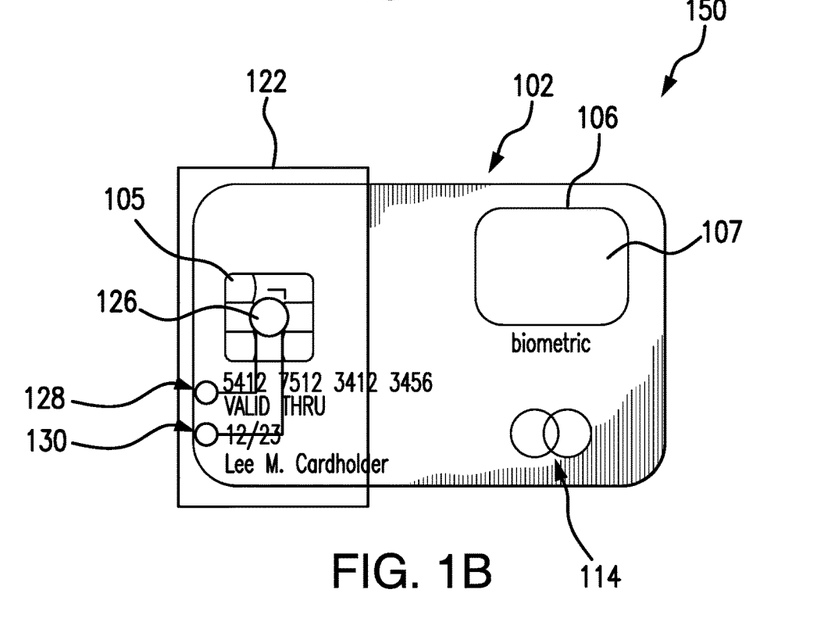
FIG. 1B illustrates an enrollment configuration of the components of the biometric payment card package of FIG. 1A according to some embodiments of the disclosure.

FIG. 1B illustrates a biometric enrollment configuration 150 that includes the biometric payment card 102 and the energy sleeve 120 of FIG. 1A in accordance with some embodiments. The biometric payment card 102 has been inserted into the energy sleeve 120 such that the battery 126 (or battery circuitry of the energy sleeve) contacts the faceplate 105 of the EMV chip 104 (of the biometric payment card 102), so that energy or power can be provided to the EMV chip via the battery 126. In addition, the energy sleeve is positioned so that the red LED 128 and the green LED 130 are both clearly visible to a consumer. In addition, the energy sleeve 120 is designed so as not to hinder or cover the fingerprint sensor pad 107 of the biometric sensor 106. Such a configuration allows the consumer to place his or her finger directly on the fingerprint sensor pad 107 during the enrollment process.

Figure 2:
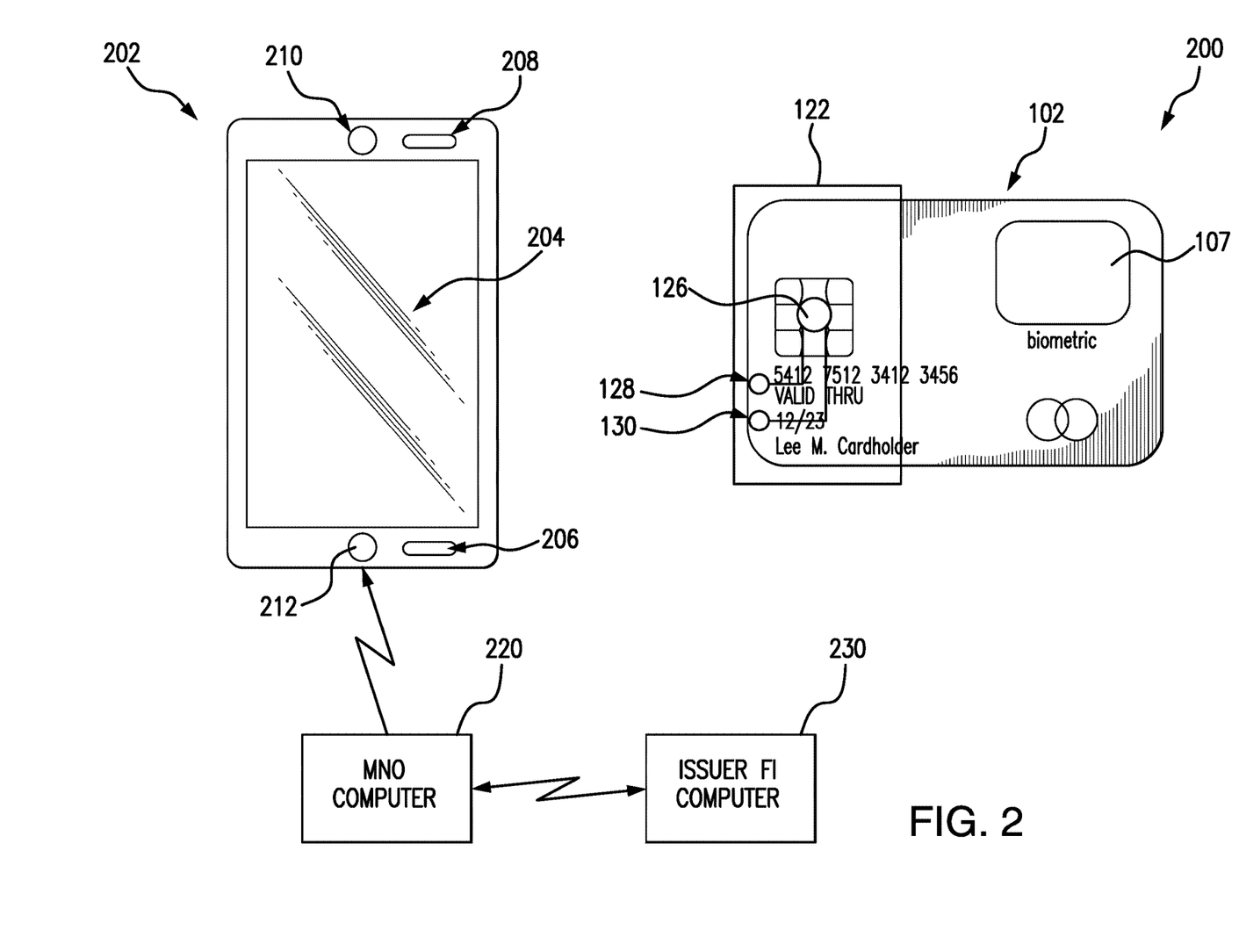
FIG. 2 is a block diagram of a biometric payment card enrollment system in accordance with some embodiments.

FIG. 2 is a block diagram of a biometric payment card enrollment system 200 in accordance with some embodiments. The system 200 includes the biometric enrollment configuration 150 depicted in FIG. 1B (wherein the biometric payment card 102 is inserted into the energy sleeve 120), the consumer's mobile device 202 (for example, a smartphone), a mobile network operator (MNO) computer 220, and an issuer financial institution (FI) computer 230. The MNO computer 220 may be owned and operated by a wireless service provider, wireless carrier, cellular company, or mobile network carrier, which provides wireless communications services to the consumer, and the issuer FI computer is owned and operated by the financial institution (such as a bank) that issued the biometric payment card to the consumer. In some embodiments, the MNO computer 220 and/or the issuer FI computer 230 may include two or more server computers in one or more computer networks.

Referring again to FIG. 2, the mobile device 202 includes hardware and/or software components that provide functionality and/or operate in accordance with the characteristics of that type of mobile device, and which is operable to aid the consumer to complete the biometric card enrollment process as described herein. In this example, the mobile device 202 is a smartphone, and thus includes hardware components such as a touch screen display 204, a microphone 206, a speaker 208, a camera 210, and a mode switch 212. The smartphone 202 also includes interior electronic components (not shown) such as controller circuitry (which may be a microprocessor, or a custom designed processor), an antenna, a memory or storage device, and also includes software configured to provide smartphone functionality. Storage devices or memory utilized in the devices and/or system components described herein may be composed of, or be any type of, non-transitory storage device that may store instructions and/or software for causing one or more processors or controller circuitry of such electronic devices to function in accordance with the novel aspects disclosed herein.

In some embodiments, the consumer's smartphone 202 is operable to communicate with the issuer FI computer 230 via the mobile network operator (MNO) computer 220, which is a wireless service provider. In some other implementations, the consumer's smartphone 202 may be configured to communicate with the issuer FI computer 230 via the Internet (not shown). In addition, the consumer's smartphone 202 is operable to communicate via the NFC or Bluetooth protocols with the energy sleeve 120 during the biometric payment card enrollment process. Thus, the smartphone 202 can be used by the customer during the biometric enrollment process to view instructions or steps (via short video presentations, or via written instructions) that guide the consumer when loading the biometric payment card with the required biometric data while at home. Thus, in some embodiments the consumer is instructed to open his or her issuer FI's online banking application, or payment card management application, which has already been downloaded onto the consumer's her smartphone 202. The consumer is also prompted to check to make sure that the smartphone's NFC functionality or Bluetooth functionality is turned ON. In some embodiments, a biometric enrollment software development kit (SDK) (provided by the issuer) sitting in the online banking or card management application (which is now running) supports access to a video that can be viewed by the customer to help conduct the steps of the biometric enrollment process.

In some embodiments, to initiate the biometric enrollment process, the customer inserts the biometric payment card 102 into the energy sleeve 120 to power up the biometric payment card. In some embodiments, one or both of the LED's 128 and 130 may then light up or illuminate to indicate proper alignment. The biometric card enrollment process may then proceed with the enrollment video appearing on the touch screen 204 of the consumer's smartphone 202 in response to a proper alignment indication received by the smartphone 202. In some implementations, the enrollment video may instruct the consumer to now place her right thumb on the fingerprint pad 107 for two seconds, and rotate according to a preset pattern. In some embodiments, if the fingerprint reader 106 obtains a good image of the consumer's right thumb print, then the green LED 130 illuminates as an indication to the consumer that he or she has provided a good thumb print. (The process may also be repeated to obtain, for example, an image of the customer's left thumb print.) In an implementation, the smartphone 202 utilizes a Bluetooth connection to ascertain that the green LED 130 has illuminated, and then this information is used by the biometric enrollment SDK to have a specific portion of the enrollment video (or an enrollment message) displayed on the touch screen 204 explaining the next step in the biometric payment card enrollment process for the consumer to follow. In this manner, the LED indications (from one or both of the red LED 128 and the green LED 130) as provided by the energy sleeve 120 are received by the smartphone 202 and then used by the biometric enrollment SDK to provide and/or display messages or instructions and/or video segments on the touch screen 204 which support the biometric payment card enrollment process via direct feedback to the customer.

In some embodiments, the consumer has successfully completed the biometric enrollment process (by providing the required biometric data, for example, via a biometric sensor), which includes storing the consumer's biometric data (i.e., thumb print data for the customer's right thumb and left thumb) onto a storage device (i.e. a memory) of the biometric payment card (which may be part of the EMV chip, for example). When this occurs, the smartphone 202 then transmits, via the MNO computer 220 (or via the Internet), an indication of successful biometric payment card enrollment to the issuer FI computer 230. In some implementations, one or both of the LEDs 128, 130 may illuminate in a predetermined pattern or manner to indicate successful biometric card enrollment, which such indication could be received by the smartphone 202. Accordingly, the described process allows a consumer to initialize and complete a stand-alone biometric enrollment process for both thumbs without supervision in the comfort of the consumer's home or office without having to travel to an issuer FI location (or some other supervised location).

Figure 3:
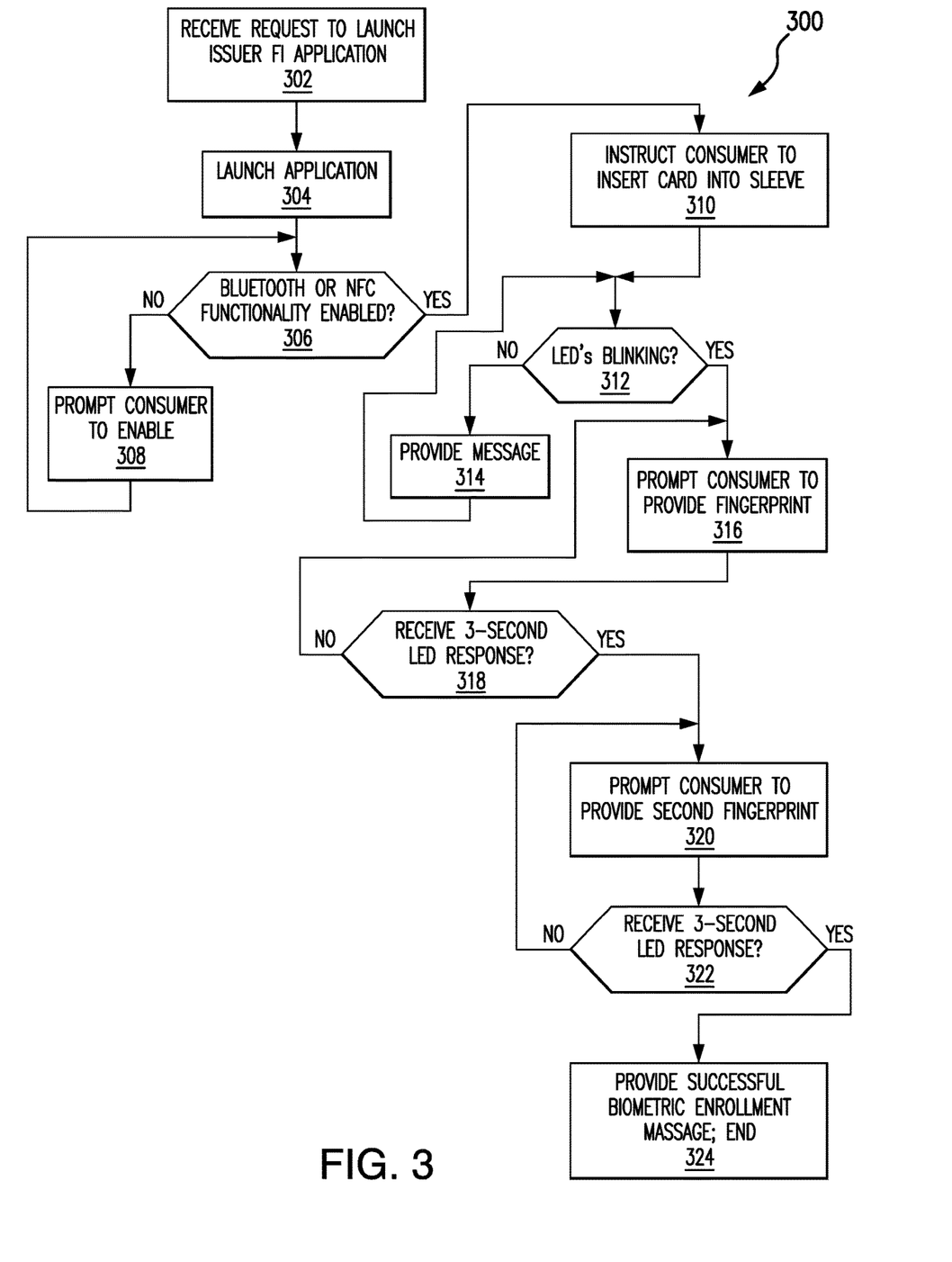
FIG. 3 is a flowchart of a biometric payment card enrollment process in accordance with some embodiments of the disclosure.

FIG. 3 is a flowchart of a biometric payment card enrollment process 300 in accordance with some embodiments. After the consumer has activated his or her biometric payment card (i.e., has called a voice recognition unit (VRU) from a home telephone number, or has logged-on to the issuer's website or application to confirm receipt of the biometric enrollment package containing the biometric payment card), a mobile device processor of the consumer's mobile device receives 302 a request to open or launch the issuer FI application used for online banking and/or for payment card control. The mobile device processor then receives 304 a request from the consumer to launch the biometric enrollment SDK (which is resident in the issuer FI application), and does so. Next, the mobile device processor determines 306 if Bluetooth functionality or NFC functionality is enabled for the mobile device. If not, then the mobile device processor prompts 308 the consumer to enable Bluetooth functionality and/or NFC functionality. In some embodiments, if Bluetooth functionality or NFC functionality is not turned ON within a predetermined amount of time (for example, 30 seconds), then the process ends with a message to the cardholder or customer appearing on the display screen 204 to turn ON such functionality if the customer wants the benefit of video instructions (not shown).

Referring again to FIG. 3, when the mobile device processor determines 306 that Bluetooth or NFC functionality is (or has been) enabled, then the mobile device processor via the biometric enrollment SDK provides 310 a message instructing the consumer to insert the biometric payment card 102 into the energy sleeve 122 so that power can be provided by the battery 126 (or battery circuitry) of the energy sleeve to the biometric payment card through the EMV faceplate. These instructions may take the form of a short video presentation, which is displayed on the touch screen of the consumer's mobile device, that shows a person inserting a biometric payment card into the energy sleeve in the correct orientation to result in a biometric enrollment configuration 150 (as depicted in FIG. 1B). Next, in some embodiments, after a predetermined amount of time passes, the mobile device processor determines 312 if one or both of the red LED 128 and green LED 130 are blinking (see FIG. 1B). In some implementations, blinking red and green LEDs 128 and 130 indicated correct alignment of the energy sleeve over the biometric payment card. Thus, if both LEDs are not blinking (an indication of misalignment), then the mobile device processor provides 314 a message (or displays a video) instructing the consumer to re-insert the biometric payment card into the energy sleeve to try to successfully align the battery connection of the energy sleeve with the EMV faceplate to power the biometric payment card. In some embodiments, if the mobile device processor does not receive an indication (i.e., blinking LEDs) that power has been provided to the biometric payment card within a predetermined amount of time (for example, 20 seconds), then the process ends with a message on the display screen 204 requesting the customer to restart the video when the cardholder is ready to retry the enrollment process (not shown).

Referring again to FIG. 3, if the mobile device processor determines 312 that both LEDs are blinking (indicating that the biometric payment card has obtained power), then the mobile device processor provides a message prompting 316 the consumer to provide a fingerprint, for example, by placing her right thumb on the fingerprint pad 107 on the face of the biometric payment card 102. This prompt may take the form of a short video showing a person placing her right thumb on the fingerprint pad, or text instructions that may accompany a drawing or graphic illustration depicted a person having his right thumb on the fingerprint pad of a biometric payment card. Next, the mobile device processor determines 318 whether the green LED illuminates for three (3) seconds and stops blinking, indicating successful capture of a fingerprint image of the consumer's right thumb. If not, then the consumer is again prompted 316 to place her finger on the fingerprint pad. In some embodiments, if the mobile device processor does not receive an indication (i.e., the green LED illuminating for 3 seconds) of successful fingerprint image capture within a predetermined amount of time (for example, 30 seconds), then the process ends (not shown). In such a case, a message may appear on the display screen 204 informing the customer of the failure.

In step 318, when the mobile device processor determines that the green LED was illuminated for three seconds, then in some embodiments, the mobile device processor prompts 320 the consumer to provide a second fingerprint by placing her left thumb, for example, on the fingerprint pad. This prompt may also take the form of a short video or graphic imagery showing a person placing her left thumb on the fingerprint pad. Next, the mobile device processor determines 322 if the green LED has again illuminated for three (3) seconds, indicating successful capture of the second fingerprint image of the consumer's left thumb. If not, then the consumer is again prompted in step 320 to place her left thumb on the fingerprint pad. In some embodiments, if the mobile device processor determines that no indication was received (i.e., the green LED has not illuminated for 3 seconds) of successful second fingerprint image capture within a predetermined amount of time (for example, 30 seconds), then the process ends (not shown). However, referring again to FIG. 3, if the mobile device processor determines, in step 322, that the green LED was illuminated for 3 seconds, then in some embodiments the mobile device processor running the biometric enrollment SDK provides 324 a biometric enrollment confirmation message to be displayed on a display screen to the consumer. The enrollment process then ends.

In some embodiments, after the consumer has successfully completed the biometric enrollment process 300 (including storing the consumer's biometric data onto a storage device (i.e. a memory) of the biometric payment card, which may be part of the EMV chip), the mobile device processor of the customer's mobile device 202 transmits an indication of successful biometric payment card enrollment to the issuer FI computer 230 (either via the MNO computer 220, via the Internet (not shown), or via some other network connection (not shown)). In some implementations, one or both of the red and/or green LEDs may illuminate in a predetermined pattern or manner to indicate successful steps during the biometric card enrollment process, which such indication(s) could then be recognized by the mobile device processor as indicating successful enrollment of the biometric payment card by the consumer.

Thus, in some embodiments the self-directed biometric enrollment process allows a consumer to follow video instructions and/or other notifications along with LED prompts so that at least two of the consumer's fingerprints are successfully enrolled and saved onto the biometric payment card. When the biometric enrollment process is successful, in some embodiments the issuer application running on the consumer's mobile device pushes out a notification to the issuer FI (and/or to other third parties) that the biometric enrollment process was successfully completed, and thus that a biometric authentication process can now be used when the consumer uses her biometric payment card to conduct a purchase transaction. Alternately, when the biometric enrollment process is unsuccessful, in some embodiments the biometric enrollment SDK may be configured and/or operable to review the enrollment process and determine where the failure occurred, which information may be communicated to the issuer FI. In addition, the biometric enrollment SDK may further be configured to determine whether a failed biometric enrollment process can be repeated or not. If a determination is made that the consumer cannot (or should not) repeat the biometric enrollment process, then the biometric enrollment SDK may cause the mobile device processor to display a message or short video directing the consumer to go to an issuer bank branch office or another authorized location for in-person service.

It should be understood that the biometric enrollment process described with reference to FIG. 3 is just one example of the steps that can be followed and the messages that may be provided to the consumer during a self-directed biometric enrollment process, with the goal of aiding the consumer to enroll while at home into his or her newly issued biometric payment card. For example, some other embodiments of the biometric enrollment process may only require one fingerprint to be stored in a memory of the biometric payment card, or may require more than two fingerprints (or may require some other type of biometric data). In addition, different LED lighting sequences could be used to represent different steps in the process, which could also be timed differently. Moreover, in some implementations infra-red LEDs could be utilized that would not produce visible light so that the consumer would have to rely solely on any written instructions provided by the issuer and/or on instructions appearing on his or her smartphone.

Figure 4:
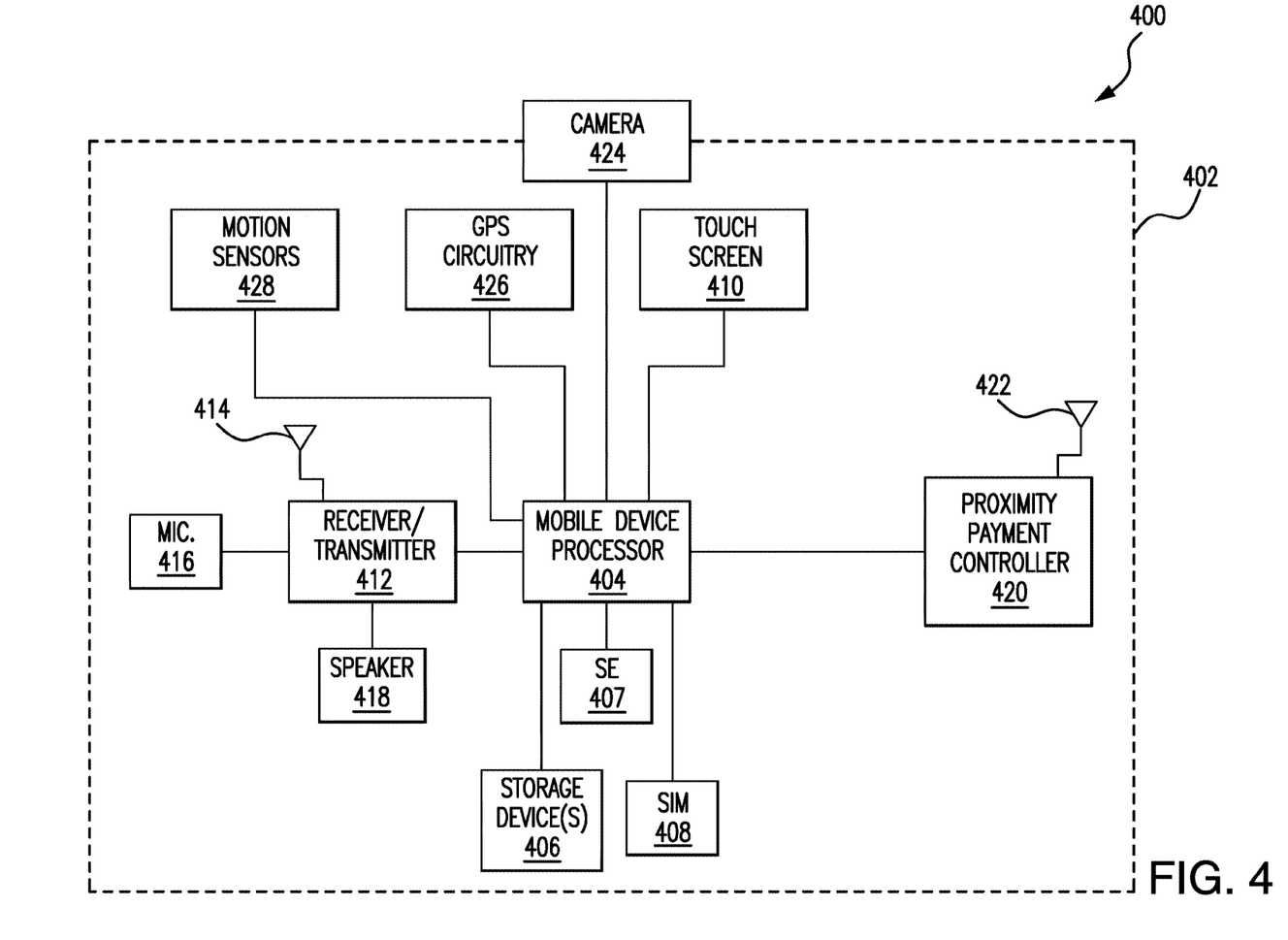
FIG. 4 is a block diagram of an embodiment of a user mobile device illustrating some hardware aspects that may be utilized during the biometric enrollment process according to some embodiments of the disclosure.

FIG. 4 is a block diagram of an embodiment of a user mobile device 400 illustrating some hardware aspects that may be utilized during the biometric enrollment process as disclosed herein. The hardware aspects can thus be used by the consumer in association with one or more issuer applications to easily and securely enroll biometric information directly into a newly issued biometric payment card without having to report to an issuer FI location.

Referring again to FIG. 4, in some embodiments the user mobile device 400 is a smartphone that may also capable of conducting online transactions, and that may (but need not) have capabilities for functioning as a contactless payment device. Thus, the mobile device 400 may capable of online and/or contactless purchase transactions, and may include hardware that is configured to provide novel functionality as described herein. In some other embodiments, however, novel functionality as described herein may result at least partially from novel software and/or middleware and/or firmware components that program or instruct one or more mobile device processors of the mobile device 400.

The smartphone 400 may include a conventional housing (indicated by dashed line 402) that contains and/or supports the other components of the mobile telephone, such as a mobile device processor 404 for controlling over-all operation. The mobile device processor 404 may be a customized processor configured to permit a consumer or user to engage in data communications and/or text messaging with other wireless devices and/or electronic devices, and/or to allow for interaction with web pages accessed via browser software over the Internet to conduct transactions and/or communicate data. In addition, the mobile device processor may be suitably programmed to run an issuer FI application which includes a biometric enrollment SDK, and to allow the smartphone to receive indications from one or more LEDs associated with an energy sleeve. The indication(s) received from the LEDs can then be used or interpreted by the mobile device processor to display video and/or messages on a display screen 410 which provide instructions and/or guidance for a consumer with regard to a biometric enrollment process. FIG. 4 also illustrates other components which are in communication with and/or are controlled by the mobile device processor 404, include one or more storage devices 406 (for example, program memory devices and/or working memory and/or secure storage devices, and the like), a secure element (SE) 407, a subscriber identification module (SIM) card 408, and a touch screen display 410 for for receiving user or consumer input as well as displaying information.

The mobile telephone 400 also includes receive/transmit circuitry 412 that is also in communication with and/or controlled by the mobile device processor 404. The receive/transmit circuitry 412 is operably coupled to an antenna 414 and provides the communication channel(s) by which the mobile telephone 900 communicates via a mobile network (not shown). The mobile telephone 400 further includes a microphone 416 operably coupled to the receive/transmit circuitry 412, and is operable to receive voice input from the user. In addition, a loudspeaker 418 is also operably coupled to the receive/transmit circuitry 412 and provides sound output to the user.

In some embodiments, the mobile telephone 400 may also include a proximity payment controller 420 which may be a specially designed integrated circuit (IC) or chipset. The proximity payment controller 420 may be a specially designed or custom-made microprocessor that is operably connected to an antenna 422, and may function to interact with, for example, a Radio Frequency Identification (RFID) device and/or Near Field Communication (NFC) device (such as a proximity reader, not shown) or a Bluetooth-enabled device. The proximity payment controller 420 is also operably connected to the mobile device processor 404, and in some embodiments is configured to receive indications from the LEDs 128 and 130 (See FIG. 2) during a biometric enrollment process, and to communicate such information to the mobile device processor 404 in accordance with processes described herein.

The user's mobile device 400 may also include one or more sensors and/or circuitry that functions to provide and/or to obtain user identification data. For example, the smartphone may include one or more authenticators, such as an integrated camera 424, global positioning sensor (GPS) circuitry 426, and one or more motion sensors 428 that are operably connected to the mobile device processor 404. Some of the authenticators can be used to perform user authentication in association with one or more digital wallet applications, and may also be functional to provide other types of data, such as mobile device identification data.

As used herein and in the appended claims, the term "computer" should be understood to encompass a single computer or two or more computers in communication with each other. In addition, as used herein and in the appended claims, a "server" includes a computer device or system that responds to numerous requests for service from other devices.

Also, as used herein and in the appended claims, the term "processor" should be understood to encompass a single processor or two or more processors in communication with each other. In addition, as used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable, including simultaneous performance of steps, and/or in an order that omits one or more steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A biometric payment card enrollment package comprising:
   a biometric payment card comprising a biometric sensor located on a front wall, the biometric sensor operably connected to an EMV chip comprising a contact faceplate located on the front wall, and a memory; and
   an energy sleeve having at least a front wall and a rear wall defining an opening therebetween and sized to accept the biometric payment card therein, the energy sleeve comprising a power source and at least one light-emitting diode, wherein the energy sleeve is configured to envelop a portion of the biometric payment card comprising the contact faceplate of the EMV chip without covering the biometric sensor to facilitate a biometric enrollment process;
   wherein the power source comprises circuitry that provides power via the contact faceplate to the EMV chip when the biometric payment card is inserted through the opening of the energy sleeve and seated therein, and provides power to the at least one LED during a biometric enrollment process.

2. The biometric payment card enrollment package of claim 1, wherein at least two LEDs are operably connected to the power source when the biometric payment card is inserted through the opening of the energy sleeve and seated therein.

3. The biometric payment card enrollment package of claim 2, wherein the at least two LEDs comprise a red LED and a green LED.

4. The biometric payment card enrollment package of claim 1, wherein the at least one LED comprises an infra-red LED.

5. The biometric payment card enrollment package of claim 1, wherein the biometric sensor comprises a fingerprint sensor comprising a fingerprint sensor pad.

6. The biometric payment card enrollment package of claim 1, wherein the biometric payment card further comprises at least one of a primary account number (PAN), expiration date and a cardholder name printed or embossed on the front wall.

7. The biometric payment card enrollment package of claim 1, wherein the biometric payment card has dimensions of approximately 85.6 millimeters (mm) by 53.98 mm.

8. The biometric payment card enrollment package of claim 1, wherein the energy sleeve is one of disposable or recyclable.

9. The biometric payment card enrollment package of claim 1, wherein the energy sleeve comprises one of a transparent material or a translucent material to aid in alignment of the biometric payment card within the energy sleeve.

10. A method for securely enrolling biometric data into a newly issued biometric payment card, comprising:
    launching, by a mobile device processor of a consumer's mobile device in response to an input, an issuer mobile payment application comprising a biometric payment card enrollment application;
    determining, by the mobile device processor, that one of near-field communication (NFC) and Bluetooth functionality of the consumer's mobile device is enabled;
    displaying, by the mobile device processor on a display screen, instructions for a consumer to insert a portion of a biometric payment card into an energy sleeve such that the contact faceplate of the EMV chip is enveloped by the energy sleeve without covering the biometric sensor;

receiving, by the mobile device processor from at least one light emitting diode (LED) of the energy sleeve, an indication that the biometric payment card is powered and thus is correctly seated within the energy sleeve;

displaying, by the mobile device processor on the display screen, instructions for the consumer to provide first biometric data;

determining, by the mobile device processor based on input received from at least one light-emitting diode (LED), that the first biometric data was successfully obtained and saved onto a memory of the biometric payment card; and displaying, by the mobile device processor on the display screen, a confirmation message indicating successful biometric payment card enrollment.

11. The method of claim 10, further comprising transmitting, by the mobile device processor to an issuer financial institution computer, a successful enrollment message.

12. The method of claim 10, further comprising, after determining that the first biometric data was successfully obtained and saved onto a memory of the biometric payment card:

displaying, by the mobile device processor on the display screen, instructions for the consumer to provide second biometric data;

determining, by the mobile device processor based on input received from the at least one LED, that the second biometric data was successfully obtained and saved onto a memory of the biometric payment card; and displaying, by the mobile device processor on the display screen, a confirmation message indicating successful biometric payment card enrollment.

13. The method of claim 10, further comprising, after launching the issuer mobile payment application:

determining, by the mobile device processor, that NFC and Bluetooth functionality of the consumer's mobile device are disabled; and prompting, by the mobile device processor via a message on the display screen, the consumer to enable at least one of the NFC and Bluetooth functionality.

14. The method of claim 10, further comprising, after displaying instructions for a consumer to insert a biometric payment card into an energy sleeve:

determining, by the mobile device processor, that the biometric payment card has not received power; and providing, by the mobile device processor, instructions on the display screen for the consumer to re-insert the portion of the biometric payment card including the contact faceplate of the EMV chip into the energy sleeve without covering the biometric sensor.

15. The method of claim 10, further comprising, after displaying instructions for the consumer to provide first biometric data:

determining, by the mobile device processor, at least one of that the first biometric data was not successfully provided and was not successfully stored on the biometric payment card; and displaying, by the mobile device processor on the display screen, instructions for the consumer to again attempt to provide first biometric data.

16. The method of claim 10, wherein the instructions comprise one of a short video demonstration or text instructions.

17. The method of claim 10, wherein the biometric information comprises fingerprint data, and wherein the consumer is instructed to place a first finger onto a fingerprint pad associated with the biometric payment card to provide biometric data.

18. A biometric payment card enrollment system comprising:

a consumer mobile device;

an enrollment package comprising a newly issued biometric payment card and an energy sleeve; and an issuer financial institution (FI) computer;

wherein the consumer mobile device is configured for communications with the issuer FI computer and with one of the energy sleeve or the biometric payment card, and wherein the consumer mobile device comprises a mobile device processor, a display screen, and a memory storing instructions configured to cause the mobile device processor to:

launch, in response to an input, an issuer mobile payment application comprising a biometric payment card enrollment application;

determine that one of near-field communication (NFC) and Bluetooth functionality of the consumer's mobile device is enabled;

display, on the display screen, instructions for a consumer to insert a portion of the biometric payment card into the energy sleeve such that the contact faceplate of the EMV chip is enveloped by the energy sleeve without covering the biometric sensor;

receive, from at least one light emitting diode (LED) associated with one of the energy sleeve or the biometric payment card, an indication that the biometric payment card is powered and thus has been correctly inserted into the energy sleeve;

display, on the display screen, instructions for the consumer to provide first biometric data;

determine, based on input received from at least one LED, that the first biometric data was successfully obtained and saved onto a memory of the biometric payment card; and display, on the display screen, a confirmation message indicating successful biometric payment card enrollment.

19. The system of claim 18, wherein the memory stores further instructions configured to cause the mobile device processor to transmit a successful enrollment message to an issuer financial institution computer.

20. The system of claim 18, wherein the memory stores, after the instructions for determining that the first biometric data was successfully obtained and saved onto a memory of the biometric payment card, further instructions configured to cause the mobile device processor to:

display, on the display screen, instructions for the consumer to provide second biometric data;

determine, based on input received from the at least one LED, that the second biometric data was successfully obtained and saved onto a memory of the biometric payment card; and display, on the display screen, a confirmation message indicating successful biometric payment card enrollment.

21. The system of claim 18, wherein the memory stores, after the instructions for launching biometric enrollment application, further instructions configured to cause the mobile device processor to:
    determine that NFC and Bluetooth functionality of the consumer's mobile device are disabled; and
    prompt the consumer to enable at least one of the NFC and Bluetooth functionality.

22. The system of claim 18, wherein the memory stores, after the instructions for displaying instructions for a consumer to insert a biometric payment card into an energy sleeve, further instructions configured to cause the mobile device processor to:
    determine that the biometric payment card has not received power; and
    provide instructions for the consumer to re-insert the biometric payment card into the energy sleeve.

23. The system of claim 18, wherein the memory stores, after the instructions for displaying instructions for the consumer to provide first biometric data, further instructions configured to cause the mobile device processor to:
    determine at least one of that the first biometric data was not successfully provided and was not successfully stored on the biometric payment card; and
    display, on the display screen, instructions for the consumer to again attempt to provide first biometric data.

\* \* \* \* \*